United States Patent
Serebrennikov

(10) Patent No.: US 10,379,197 B2
(45) Date of Patent: Aug. 13, 2019

(54) DONGLES FOR CONTROLLING VEHICLE DRIVE ASSIST SYSTEMS

(71) Applicant: Ford Global Technologies, LLC, Dearborn, MI (US)

(72) Inventor: Michael Serebrennikov, West Bloomfield, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 34 days.

(21) Appl. No.: 15/671,626

(22) Filed: Aug. 8, 2017

(65) Prior Publication Data
US 2019/0049547 A1 Feb. 14, 2019

(51) Int. Cl.
*G01S 5/00* (2006.01)
*G08G 1/00* (2006.01)
*B60W 50/00* (2006.01)
*G01S 19/39* (2010.01)
*G06F 21/30* (2013.01)
*G06F 21/35* (2013.01)
*G08G 1/123* (2006.01)

(52) U.S. Cl.
CPC .......... *G01S 5/0027* (2013.01); *G01S 19/39* (2013.01); *G06F 21/305* (2013.01); *G06F 21/35* (2013.01); *G08G 1/205* (2013.01); *G08G 1/207* (2013.01); *B60W 2050/0077* (2013.01); *B60W 2050/0078* (2013.01); *G06F 2221/2111* (2013.01); *G08G 1/123* (2013.01)

(58) Field of Classification Search
CPC ....... G01S 5/0027; G01S 19/39; G08G 1/205; G08G 1/207; G08G 1/123; G06F 21/305; G06F 21/35; B60W 2050/0077; B60W 2050/0078
See application file for complete search history.

(56) References Cited

U.S. PATENT DOCUMENTS

| | | | |
|---|---|---|---|
| 8,010,286 B2 * | 8/2011 | Templeton et al. ...... | H04N 7/18 701/412 |
| 8,121,784 B2 * | 2/2012 | Templeton et al. .... | G01C 21/34 701/516 |
| 8,897,926 B2 | 11/2014 | Stahlin et al. | |
| 9,358,986 B2 * | 6/2016 | Hunt ...................... | F02D 41/26 |
| 9,452,780 B2 | 9/2016 | Schumacher et al. | |
| 2009/0006699 A1 * | 1/2009 | Rofougaran .......... | G01S 5/0027 710/304 |
| 2009/0047068 A1 * | 2/2009 | Bucalo ..................... | E01F 9/50 404/9 |

(Continued)

FOREIGN PATENT DOCUMENTS

WO WO 2013174788 A1 11/2013

*Primary Examiner* — Dale W Hilgendorf
(74) *Attorney, Agent, or Firm* — Frank Lollo; Neal, Gerber & Eisenberg LLP; James P. Muraff

(57) ABSTRACT

Method and apparatus are disclosed for dongles for controlling vehicle drive-assist systems. An example vehicle includes an electronic control unit for performing an autonomous motive function, an OBD port configured to receive a dongle to communicatively couple to the dongle, and a driver-assist controller. The driver-assist controller is configured to receive instructions from the dongle when the vehicle is at a racing event location responsive to the OBD port receiving the dongle and deactivate the autonomous motive function when receiving the instructions.

18 Claims, 5 Drawing Sheets

(56) References Cited

U.S. PATENT DOCUMENTS

| | | | |
|---|---|---|---|
| 2011/0112969 A1* | 5/2011 | Zaid et al. | G06F 21/35 |
| | | | 701/2 |
| 2012/0083964 A1* | 4/2012 | Montemerlo et al. | |
| | | | G05D 1/0088 |
| | | | 701/26 |
| 2013/0203365 A1 | 8/2013 | Tieman | |
| 2014/0156134 A1* | 6/2014 | Cullinane et al. | G05D 1/0061 |
| | | | 701/23 |
| 2015/0241878 A1* | 8/2015 | Crombez et al. | G05D 1/0088 |
| | | | 701/23 |
| 2015/0251676 A1* | 9/2015 | Golden et al. | B61L 15/0027 |
| | | | 701/19 |
| 2016/0252904 A1* | 9/2016 | Sakai et al. | G05D 1/0061 |
| | | | 701/26 |
| 2016/0293214 A1* | 10/2016 | Jones et al. | G11B 27/036 |
| 2016/0347327 A1* | 12/2016 | Kondo et al. | B60W 50/082 |
| 2017/0058811 A1* | 3/2017 | Misson et al. | F02P 5/1502 |
| 2017/0259832 A1* | 9/2017 | Lathrop et al. | G05D 1/0061 |
| 2018/0059671 A1* | 3/2018 | Sogen et al. | G05D 1/0214 |
| 2018/0284759 A1* | 10/2018 | Michalakis et al. | |
| | | | G05D 1/0061 |

\* cited by examiner

DONGLES FOR CONTROLLING VEHICLE DRIVE ASSIST SYSTEMS

TECHNICAL FIELD

The present disclosure generally relates to dongles and, more specifically, to dongles for controlling vehicle drive-assist systems.

BACKGROUND

Many vehicles include drive-assist features in which at least some motive functions of a vehicle are autonomously controlled by the vehicle. For example, some vehicles include cruise control in which the vehicle controls acceleration and/or deceleration of the vehicle so that a speed of the vehicle is maintained. Some vehicles include lane-departure warning and/or correction systems in which the vehicle warns a driver that the vehicle is leaving a lane and/or autonomously steers the vehicle back into the lane. Further, some vehicles include a collision avoidance system in which the vehicle autonomously steers and/or decelerates the vehicle to avoid a collision with a detected object upon detecting that the vehicle is quickly approaching the object.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for dongles for controlling vehicle drive-assist systems. An example disclosed vehicle includes an electronic control unit for performing an autonomous motive function, an OBD port configured to receive a dongle to communicatively couple to the dongle, and a driver-assist controller. The driver-assist controller is configured to receive instructions from the dongle when the vehicle is at a racing event location responsive to the OBD port receiving the dongle and deactivate the autonomous motive function when receiving the instructions.

An example disclosed dongle includes a connector to couple to a port of a vehicle, a GPS receiver to determine a dongle location, and a communication module to receive, from a remote control unit, instructions for deactivating an autonomous motive function of the vehicle. The example disclosed dongle also includes a processor to send the instructions to the vehicle responsive to the connector being coupled to the port and determining that the dongle location corresponds to a racing event location.

An example disclosed method includes determining a dongle location of a dongle via a GPS receiver and receiving, via a communication module of the dongle, instructions from a remote control unit to deactivate an autonomous motive function of a vehicle. The example disclosed method also includes sending, via a processor of the dongle, the instructions to the vehicle responsive to the dongle being coupled to a port of the vehicle and the dongle location corresponding to a racing event location.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
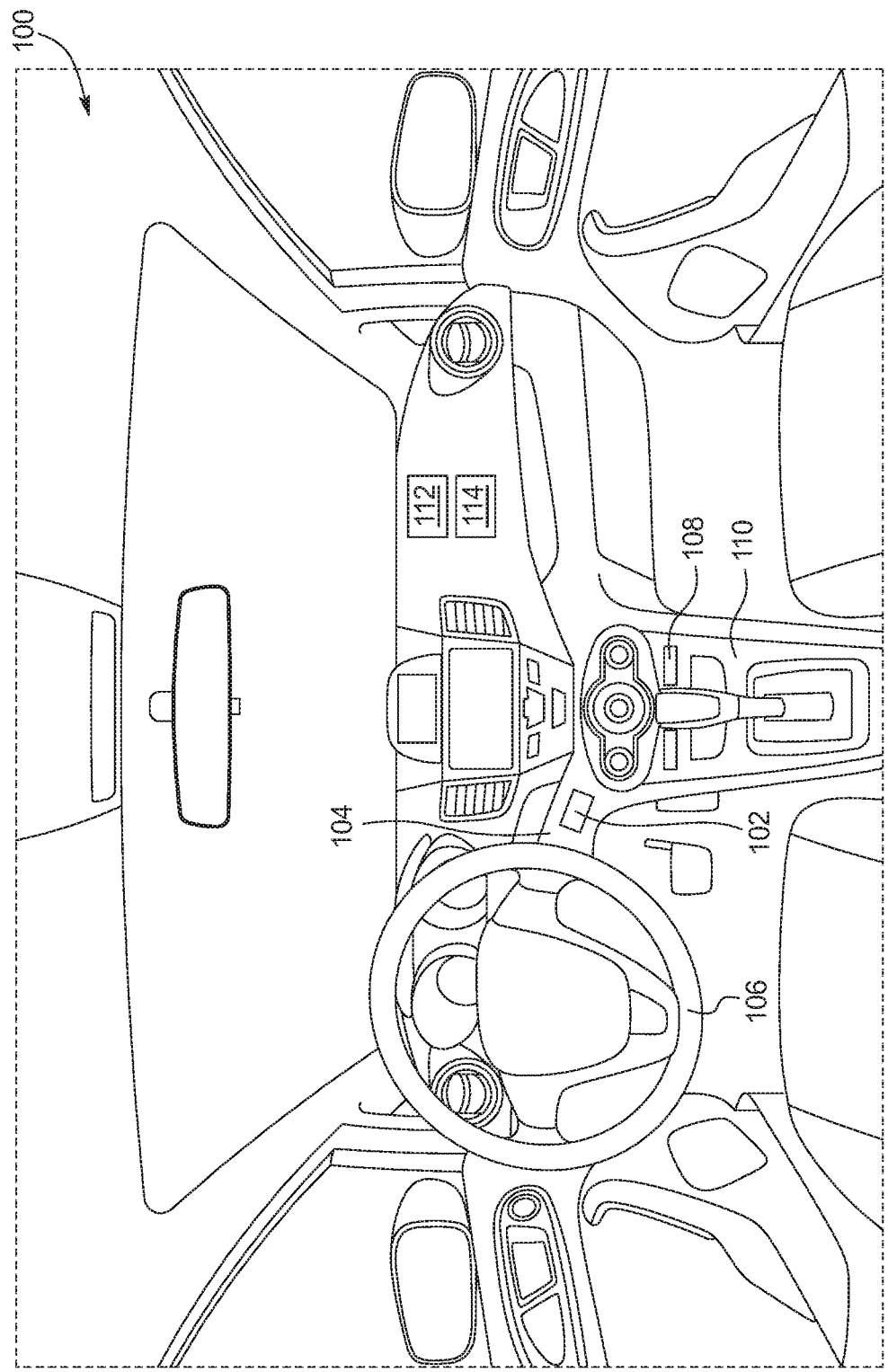
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Many vehicles include drive-assist features in which at least some motive functions of a vehicle are autonomously controlled by the vehicle. For example, some vehicles include cruise control in which the vehicle controls acceleration and/or deceleration of the vehicle so that a speed of the vehicle is maintained. Some vehicles include lane-departure warning and/or correction systems in which the vehicle warns a driver that the vehicle is leaving a lane and/or autonomously steers the vehicle back into the lane. Further, some vehicles include a collision avoidance system in which the vehicle autonomously steers and/or decelerates the vehicle to avoid a collision with a detected object upon detecting that the vehicle is quickly approaching the object.

Further, some vehicle enthusiasts participate in racing events (e.g., track days) during which the vehicle enthusiasts are able to race their vehicles around a track. The track may be a dedicated race track or a temporary track that is set up within a parking lot or an airfield. In some instances, one or more drive-assist systems and/or autonomous motive functions of the vehicle (e.g., a cruise control system, a lane-departure warning and/or correction system, a collision avoidance system, etc.) potentially may activate while the driver is operating the vehicle on the track. Activation of a drive-assist system and/or autonomous motive function may prevent the vehicle from operating under typical racing conditions and, thus, potentially may be undesirable for a vehicle enthusiast driving his or her vehicle on the track.

Example methods and apparatus disclosed herein include a dongle that is connected to a communication port of a vehicle during a racing event to deactivate one or more drive-assist systems and/or autonomous motive functions of the vehicle during the racing event to enable a driver to operate the vehicle under racing conditions during the racing event. Further, example methods and apparatus disclosed herein include reactivate the drive-assist systems and/or autonomous motive functions of the vehicle when the dongle is not connected to the communication port and/or when the vehicle is not participating in the racing event to facilitate the driver in safely operating the vehicle in standard driving settings.

As used herein, a "dongle" refers to a small electronic device that is configured to physically couple to another device to establish a communicative connection with the other device to adjust, alter, and/or otherwise affect functionality of the other device. Example dongles include a connector that is configured to be received by a receptacle or port of the other device (e.g., a vehicle) to establish a communicative connection with the other device.

Examples disclosed herein include temporarily deactivating, via a dongle, drive-assist systems of a vehicle for racing events. The dongle is configured to plug into a port (e.g., an on-board diagnostics (OBD)) port of the vehicle. A GPS receiver identifies a dongle location and/or a vehicle location when the dongle is inserted into the port. If the dongle is plugged into the port of the vehicle and the dongle location corresponds to a predefined racing event location (e.g., a race track, a parking lot and/or an airfield temporarily designated as a racing event location), the dongle deactivates one or more drive-assist systems of the vehicle to facilitate the vehicle in participating in the racing event. In some examples, a current time is also utilized to determine whether to deactivate the drive-assist systems. That is, the dongle deactivates one or more drive-assist systems of the vehicle if the dongle location and the current time correspond to a racing event location and a racing event time, respectively, of a racing event. The vehicle reactivates the one or more drive-assist systems if the dongle is removed from the port, the vehicle is outside of the predefined racing event location, and/or the current time is outside of the predefined racing event time. The dongle is synced with a remote control unit to enable the dongle to control deactivation of the drive-assist systems of the vehicle.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

As illustrated in FIG. 1, the vehicle 100 includes on-board diagnostics (OBD) port 102 that is located within a cabin of the vehicle 100. The OBD port 102 is configured to receive a connector of a diagnostics tool (e.g., a computer, a handheld device, etc.). When the diagnostics tool is connected to the OBD port 102, the diagnostics tool is capable of communicatively coupling to and accessing and analyzing status(es) and/or other information of electronic control units (e.g., ECUs 406 of FIG. 4) and/or other subsystems of the vehicle 100. For example, the diagnostics tool connects to the OBD port 102 to identify, diagnose, and/or remedy bug(s), malfunction(s), and/or undesirable setting(s) within the electronic control units and/or other subsystems of the vehicle 100. In the illustrated example, the OBD port 102 is located on a front dash panel 104 of the vehicle 100. For example, the OBD port 102 is located on the front dash panel 104 adjacent to (e.g., below and/or to the side of) a steering wheel 106 of the vehicle 100 to enable a user (e.g., a driver) to easily access the OBD port 102. In other examples, the OBD port 102 is located at any other position along the front dash panel 104 and/or another surface within the cabin of the vehicle 100 that enables the user to easily access the OBD port 102.

The vehicle 100 of the illustrated example also includes a universal serial bus (USB) port 108. The USB port 108 includes a receptacle for receiving a USB connector of an electronic device. Universal serial bus (USB) is an industry standard that includes standards for cables, connectors, power supply, and communication protocols for communication between electronic devices. In the illustrated example, the USB port 108 is located on a center console 110 of the vehicle 100 to enable the user to easily access the USB port 108. In other examples, the USB port 108 is located at any other position within the cabin of the vehicle 100 that enables the user to easily access the USB port 108.

Further, the vehicle 100 of the illustrated example includes a global positioning system (GPS) receiver 112 and a drive-assist controller 114. The GPS receiver 112 receives a signal from a global positioning system to identify a location of the vehicle 100. The drive-assist controller 114 is configured to deactivate drive-assist system(s) and/or autonomous motive function(s) performed by electronic control unit(s) (e.g., one or more of the ECUs 406).

Figure 2:
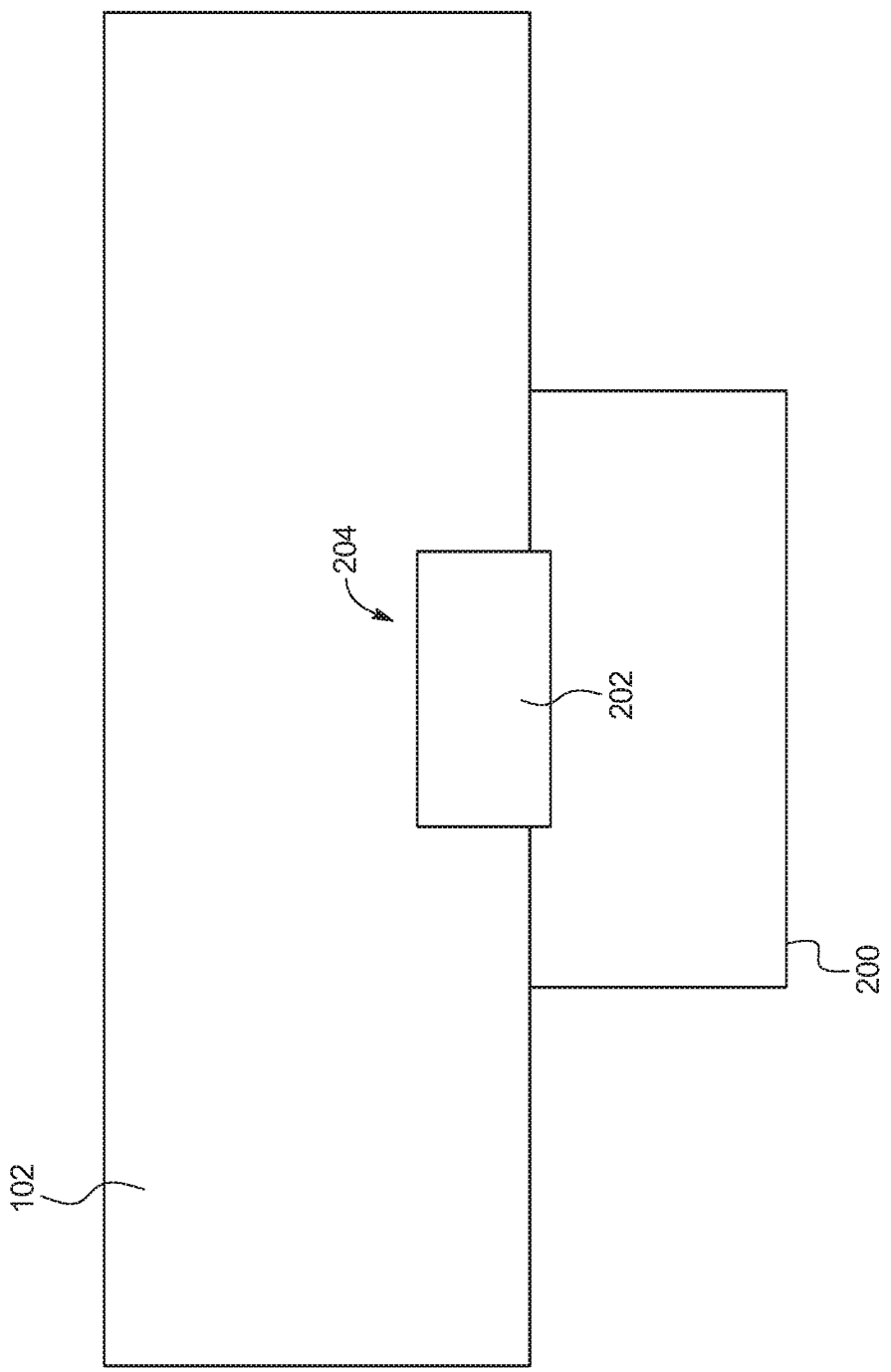
FIG. 2 illustrates an example dongle coupled to a port of the vehicle of FIG. 1 in accordance with the teachings herein.

In operation, a communication port (e.g., the OBD port 102, the USB port 108) of the vehicle 100 receives a dongle (e.g., a dongle 200 of FIG. 2). The drive-assist controller 114 is communicatively coupled to the dongle when the dongle is received by the communication port of the vehicle 100. The drive-assist controller 114 receives instructions from the dongle when the vehicle 100 is at a racing event responsive to the communication port receiving the dongle. For example, the drive-assist controller 114 receives instructions from the dongle when the vehicle 100 is at a location (e.g., determined via the GPS receiver 112 and/or a GPS receiver 426 of FIG. 4) that corresponds to a racing event location at a time (e.g., a current time) that corresponds to a racing event time. The drive-assist controller 114 deactivates drive-assist system(s) and/or autonomous motive function(s) of electronic control unit(s) of the vehicle 100 (e.g., an autonomy unit 414, a speed control unit 416, a brake control module 418, and/or another of the ECUs 406 of FIG. 4) when receiving the instructions from the dongle. The drive-assist controller 114 determines which of the drive-assist system(s) and/or autonomous motive function(s) of the vehicle 100 to deactivate based upon the instructions received from the dongle and/or vehicle characteristics (e.g., a vehicle type including a make, a model, a year, etc.). Further, the drive-assist controller 114 activates (e.g., sets in a default activated mode) the drive-assist system(s) and/or the autonomous motive function(s) when not receiving the instructions from the dongle. For example, upon deactivating the drive-assist system(s) and/or the autonomous motive function(s), the drive-assist controller 114 reactivates the drive-assist system(s) and/or the autonomous motive function(s) responsive to the dongle decoupling from the communication port of the vehicle 100, the vehicle 100 not being at the racing event location, and/or the current time not corresponding to the racing event time.

FIG. 2 illustrates an example dongle 200 that is configured to control operation of drive-assist system(s) and/or autonomous motive function(s) of the vehicle 100. In the illustrated example, the dongle 200 includes a connector 202 that couples to a receptacle 204 of the OBD port 102. That is, the receptacle 204 of the OBD port 102 is configured to receive the connector 202 of the dongle 200, and the connector 202 of the dongle 200 is configured to be received by the receptacle 204 of the OBD port 102. In other examples, the dongle 200 includes a receptacle that receives a connector of an OBD module of the vehicle 100 to establish a communicative coupling between the dongle 200 and the drive-assist controller 114. Further, in other examples, the dongle 200 is configured to couple to the USB port 108 of the vehicle 100 (e.g., the connector 202 is configured to be received by a receptacle of the USB port 108).

The dongle 200 of the illustrated example is communicatively coupled to the drive-assist controller 114 of the vehicle 100 when the connector 202 of the dongle 200 is coupled to the receptacle 204 of the OBD port 102. For example, a processor (e.g., a processor 420 of FIG. 4) of the dongle 200 sends instructions that deactivate drive-assist system(s) and/or autonomous motive function(s) of electronic control unit(s) to the drive-assist controller 114 of the vehicle 100 when the vehicle 100 is at a racing event. For example, the processor of the dongle 200.

In some examples, the instructions sent by the dongle 200 correspond to racing event characteristics of the racing event, vehicle characteristics of the vehicle 100, weather conditions, etc. that affect which of the drive-assist system(s) and/or autonomous motive function(s) are to be deactivated while the vehicle 100 participates in the racing event. For example, the processor of the dongle 200 selects the instructions that are sent to the drive-assist controller 114 of the vehicle 100 based upon a vehicle type (e.g., a make, a model, a year, etc.), electronic control units included in the vehicle 100, settings of the electronic control units, and/or any other vehicle characteristics by the vehicle 100. In the illustrated example, the processor of the dongle 200 obtains the vehicle characteristics of the vehicle 100 when the connector 202 of the dongle 200 is coupled to the OBD port 102 of the vehicle 100.

Figure 3:
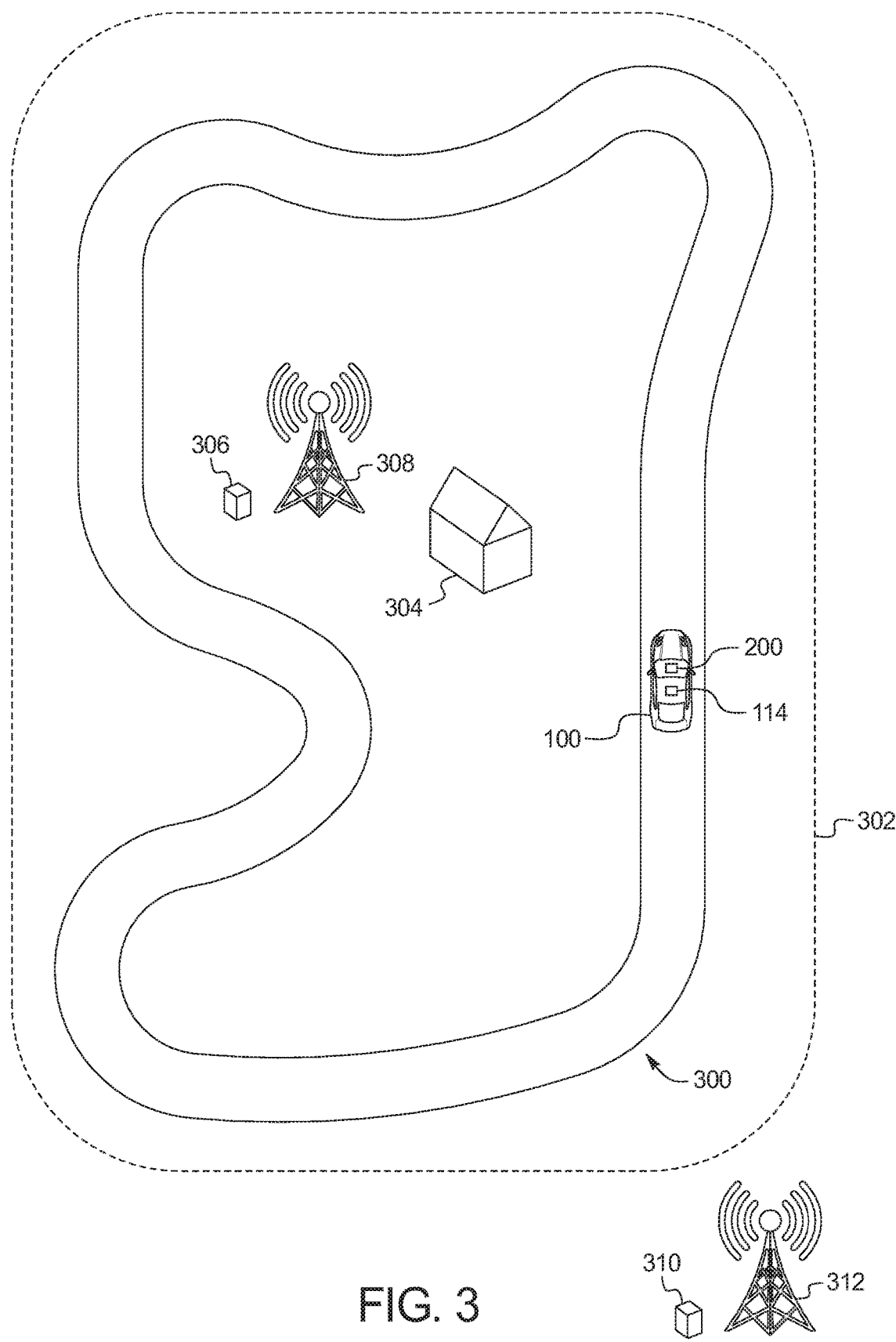
FIG. 3 illustrates the vehicle of FIG. 1 travelling along a race track when the dongle is coupled to the port of FIG. 2.

FIG. 3 illustrates the vehicle 100 travelling along a race track 300 when the dongle 200 is communicatively coupled to the drive-assist controller 114 of the vehicle 100 via the OBD port 102. The race track 300 (e.g., the racing event location) of the illustrated example is a dedicated race track and/or a temporary race track formed within a parking lot, an airfield, etc. As illustrated in FIG. 3, a geofence 302 corresponds to and surrounds the race track 300. In some examples, the geofence 302 is utilized to determine whether the vehicle 100 and/or the dongle 200 are located at the racing event location.

In some examples, a driver of the vehicle 100 obtains the dongle 200 from a racing event station 304 upon arriving at the race track 300. For example, the driver also goes to the racing event station 304 before the racing event to register and/or sign in for the racing event. After the driver obtains the dongle 200 from the racing event station 304, the driver plugs the dongle 200 into the OBD port 102. During the racing event, the dongle 200 wirelessly receives (e.g., via a communication module 424 of FIG. 4) instructions from a remote control unit 306 of the racing event via a wireless communication device 308. For example, the wireless communication device 308 transmits signals to the dongle 200 of the vehicle 100 and/or other dongles of other vehicles during the racing event to deactivate drive-assist system(s) and/or autonomous motive function(s) of the vehicle 100 and/or the other vehicles during the racing event on the race track 300. That is, the wireless communication device 308 sends and the dongle 200 of the vehicle 100 receives the instructions of the remote control unit 306 via the wireless communication device 308 during a racing event time of the racing event at the race track 300.

In such examples, the processor of the dongle 200 sends the instructions to the drive-assist controller 114 to deactivate drive-assist system(s) and/or autonomous motive function(s) of the vehicle 100 when a dongle location of the dongle 200 (e.g., determined via a GPS receiver 426 of FIG. 4) and/or a vehicle location of the vehicle 100 (e.g., determined via a GPS receiver 112 of FIG. 1) is within the geofence 302 that corresponds to the racing event location at the race track 300. The dongle 200 causes the drive-assist controller 114 to deactivate one or more drive-assist systems and/or autonomous motive functions to enable the driver to operate the vehicle 100 under racing conditions during the racing event on the race track 300. In the illustrated example, the processor of the dongle 200 determines whether the dongle 200 and, thus, the vehicle 100 are located within the geofence 302 based upon geofence information sent to the dongle 200 from the remote control unit 306 and a dongle location determined by a GPS receiver of the dongle (e.g., the GPS receiver 426) and/or the vehicle (e.g., the GPS receiver 112).

Further, the processor of the dongle 200 stops sending the instructions to the drive-assist controller 114 when the wireless communication device 308 stops transmitting the instructions. For example, the wireless communication device 308 does not transmit the instructions before the racing event starts and after the racing event ends. The processor of the dongle 200 stops sending the instructions to the drive-assist controller 114 when the dongle 200 is removed from the OBD port 102. Additionally, the processor of the dongle 200 stops sending the instructions to the drive-assist controller 114 in response to determining that the dongle location and/or the vehicle location is outside of the geofence 302 that corresponds to the racing event location of the race track 300. The drive-assist controller 114 reactivates the drive-assist system(s) and/or autonomous motive function(s) when the drive-assist controller 114 is not receiving the instructions from the dongle 200. The drive-assist controller 114 reactivates the drive-assist system(s) and/or autonomous motive function(s) to cause the vehicle 100 to perform the drive-assist system(s) and/or autonomous motive function(s) when the vehicle 100 is not participating in a racing event.

In other examples, a driver of the vehicle 100 obtains the dongle 200 prior to arriving at the race track 300. For example, the driver purchases the dongle 200 from an original equipment manufacturer and/or a third-party to enable the driver to operate the vehicle 100 without the drive-assist system(s) and/or autonomous motive function(s) at a plurality of different racing events. In such examples, the driver of the vehicle 100 may plug the dongle 200 into the OBD port 102 of the vehicle 100 at any time. When the dongle 200 is coupled to the OBD port 102 during the racing event, the dongle 200 wirelessly receives (e.g., via the communication module 424) instructions from a universal remote control unit 310 via a wireless communication device 312. The universal remote control unit 310 includes a database that stores racing event times, racing event locations, and instructions for a plurality of scheduled racing events. For example, the wireless communication device 312 transmits signals to the dongle 200 of the vehicle 100 and/or other dongles of other vehicles that identify racing event times of racing events, racing event locations of the racing events, and instructions for deactivating drive-assist system(s) and/or autonomous motive function(s) for the racing events. That is, the wireless communication device 312 for the universal remote control unit 310 sends the racing event time, the racing event location, and the instructions for the racing event at the race track 300 and/or sends racing event times, racing event locations, and instructions for other racing events (e.g., at other race tracks).

In such examples, the processor of the dongle 200 sends the instructions to the drive-assist controller 114 to deactivate drive-assist system(s) and/or autonomous motive function(s) of the vehicle 100 when the dongle 200 is connected to the OBD port 102, the dongle location (e.g., determined via the GPS receiver 426) and/or the vehicle location (e.g., determined via the GPS receiver 112) is within the geofence 302 of the racing event location, and a current time (e.g., determined via a clock 428 of FIG. 4) corresponds to the racing event time. For example, the processor of the dongle 200 determines whether the dongle 200 and/or the vehicle 100 are located within the geofence 302 based upon geofence information of the universal remote control unit 310 and the dongle location (e.g., determined via the GPS receiver 426) and/or the vehicle location (e.g., determined via the GPS receiver 112). The processor of the dongle 200 determines whether the current time corresponds to the racing event time by comparing racing event information of the universal remote control unit 310 to the current time determined via a clock (e.g., the clock 428).

Further, the processor of the dongle 200 stops sending the instructions to the drive-assist controller 114 when the dongle 200 is removed from the OBD port 102, the dongle location and/or the vehicle location is not within the geofence 302, and/or when the current time does not correspond to the racing event time. In the illustrated example, the drive-assist controller 114 reactivates the drive-assist system(s) and/or autonomous motive function(s) when the drive-assist controller 114 is not receiving the instructions from the dongle 200.

Figure 4:
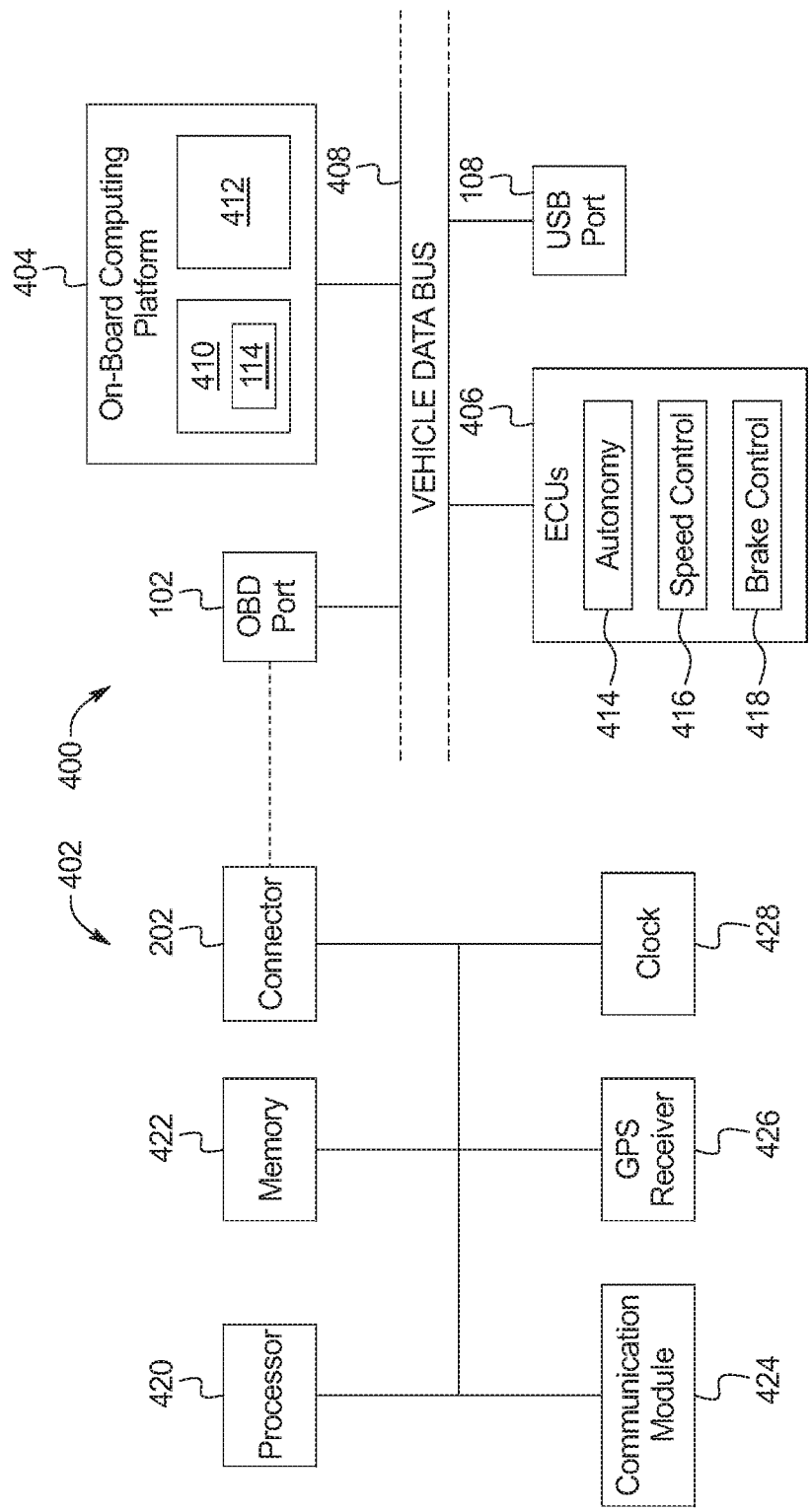
FIG. 4 is a block diagram of electronic components of the vehicle of FIG. 1 and the dongle of FIG. 2.

FIG. 4 is a block diagram of electronic components 400 of the vehicle 100 and electronic components 402 of the dongle 200. As illustrated in FIG. 4, the electronic components 400 of the vehicle 100 include the OBD port 102, an on-board computing platform 404, electronic control units (ECUs) 406, the USB port 108, and a vehicle data bus 408.

The on-board computing platform 404 includes a microcontroller unit, controller or processor 410 and memory 412. In some examples, the processor 410 of the on-board computing platform 404 is structured to include drive-assist controller 114. Alternatively, in some examples, the drive-assist controller 114 is incorporated into another electronic control unit (ECU) with its own processor and memory. The processor 410 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 412 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 412 includes multiple kinds of memory, particularly volatile memory and non-volatile memory.

The memory 412 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 412, the computer readable medium, and/or within the processor 410 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The ECUs 406 monitor and control the subsystems of the vehicle 100. For example, the ECUs 406 are discrete sets of electronics that include their own circuit(s) (e.g., integrated circuits, microprocessors, memory, storage, etc.) and firmware, sensors, actuators, and/or mounting hardware. The ECUs 406 communicate and exchange information via a vehicle data bus (e.g., the vehicle data bus 408). Additionally, the ECUs 406 may communicate properties (e.g., status of the ECUs 406, sensor readings, control state, error and diagnostic codes, etc.) to and/or receive requests from each other. For example, the vehicle 100 may have seventy or more of the ECUs 406 that are positioned in various locations around the vehicle 100 and are communicatively coupled by the vehicle data bus 408.

In the illustrated example, the ECUs 406 include an autonomy unit 414, a speed control unit 416, and a brake control module 418 for performing autonomous motive function(s) of the vehicle 100. For example, the autonomy unit 414 controls drive-assist system(s) that perform autonomous and/or semi-autonomous driving maneuvers of the vehicle 100 based upon, at least in part, image(s) and/or video captured by camera(s) and/or data collected by sensor(s) of the vehicle 100. Additionally or alternatively, the speed control unit 416 controls drive-assist system(s) that autonomously control a speed and/or acceleration at which the vehicle 100 travels, and the brake control module 418 controls drive-assist system(s) that autonomously operate braking of the vehicle 100.

The vehicle data bus 408 communicatively couples the OBD port 102, the USB port 108, the on-board computing platform 404, and the ECUs 406. In some examples, the vehicle data bus 408 includes one or more data buses. The vehicle data bus 408 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Further, as illustrated in FIG. 4, the electronic components 402 of the dongle 200 include a processor 420, memory 422, the connector 202, a communication module 424, a GPS receiver 426, and a clock 428 that are communicatively coupled together.

The processor 420 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 422 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 422 includes multiple kinds of memory, particularly volatile memory and non-volatile memory. Further, the memory 422 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 422, the computer readable medium, and/or within the processor 420 during execution of the instructions.

The communication module 424 enables the dongle 200 to wirelessly communicate with a server to obtain instructions for deactivating drive-assist systems of the vehicle 100. For example, the communication module 424 enables the dongle 200 to wirelessly communicate with the remote control unit 306 via the wireless communication device 308 and/or the universal remote control unit 310 via the wireless communication device 312.

The communication module 424 of the illustrated example includes wired or wireless network interfaces to enable communication with external networks. The communication module 424 also includes hardware (e.g., processors, memory, storage, antenna, etc.) and software to control the wired or wireless network interfaces. In the illustrated example, the communication module 424 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, the communication module 424 includes a wired or wireless interface (e.g., an auxiliary port, a Universal Serial Bus (USB) port, a Bluetooth® wireless node, etc.) to communicatively couple with a communication devices. The external network(s) may be a public network, such as the Internet; a private network, such as an intranet; or combinations thereof, and may utilize a variety of networking protocols now available or later developed including, but not limited to, TCP/IP-based networking protocols.

The GPS receiver 426 of the illustrated example receives a signal from a global positioning system to identify a location of the dongle 200. Thus, when the dongle 200 is coupled to the OBD port 102 and/or other port of the vehicle 100, the GPS receiver 426 receives a signal to identify the location of the vehicle 100. Additionally, the clock 428 of the dongle 200 identifies a current time.

Figure 5:
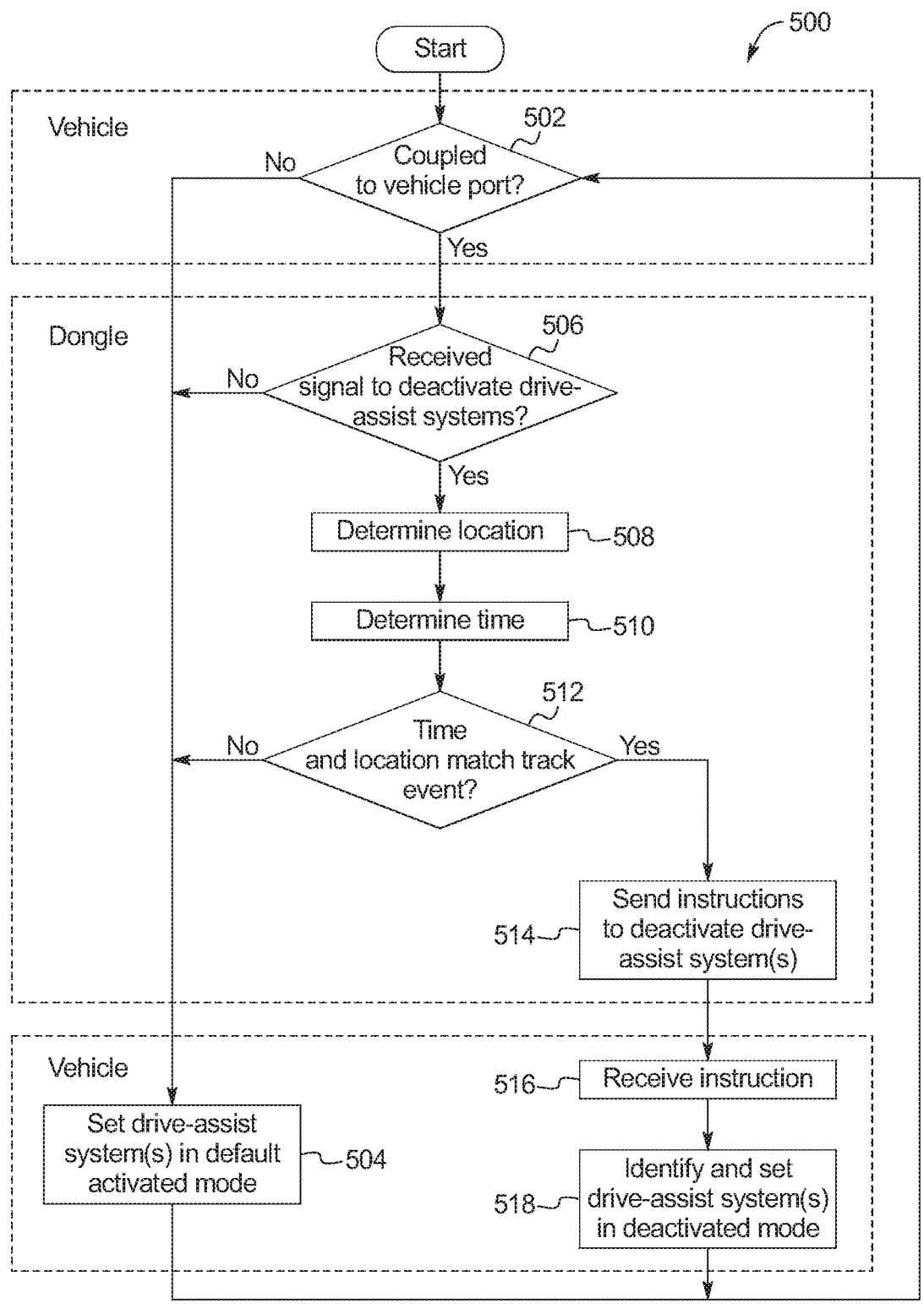
FIG. 5 is a flowchart for controlling drive-assists systems of the vehicle of FIG. 1 via the dongle of FIG. 2 in accordance with the teachings herein.

FIG. 5 is a flowchart of an example method 500 to control operation of drive-assist system(s) of a vehicle via a dongle. The flowchart of FIG. 5 is representative of machine readable instructions that are stored in memory (such as the memory 412 and/or memory 422 of FIG. 4) and include one or more programs which, when executed by a processor (such as the processor 410 and/or the processor 420 of FIG. 4), control operation of vehicle drive-assist system(s) (e.g., by, at least in part, causing the vehicle 100 to implement the example drive-assist controller 114 of FIGS. 1 and 4). While the example program is described with reference to the flowchart illustrated in FIG. 5, many other methods of controlling operation of vehicle drive-assist system(s) (e.g., by, at least in part, implementing the example drive-assist controller 114) may alternatively be used. For example, the order of execution of the blocks may be rearranged, changed, eliminated, and/or combined to perform the method 500. Further, because the method 500 is disclosed in connection with the components of FIGS. 1-4, some functions of those components will not be described in detail below.

Initially, at block 502, the drive-assist controller 114 of the vehicle 100 determines whether the dongle 200 is coupled to a vehicle port (e.g., the OBD port 102, the USB port 108). In response to the drive-assist controller 114 determining that the dongle 200 is not coupled to the vehicle port, the method proceeds to block 504 at which the drive-assist controller 114 of the vehicle 100 sets drive-assist system(s) and/or autonomous motive function(s) of the ECUs 406 to corresponding default activated mode(s) to activate the drive-assist system(s) and/or autonomous motive function(s). Otherwise, in response to the drive-assist controller 114 determining that the dongle 200 is coupled to the vehicle port, the method 500 proceeds to block 506.

At block 506, the processor 420 of the dongle 200 determines whether the communication module 424 of the has received a signal from a remote control unit (e.g., the remote control unit 306, the universal remote control unit 310) that includes instructions to deactivate drive-assist system(s) and/or autonomous motive function(s) of the vehicle 100. In some examples, the signal also includes racing event time information and racing event location information of one or more racing events. In response to the processor 420 of the dongle 200 determining that the communication module 424 has not received the instructions from a remote control unit, the processor 420 of the dongle 200 does not send the instructions to the drive-assist controller 114 of the vehicle 100. Subsequently, the method 500 proceeds to block 504 at which the drive-assist controller 114 of the vehicle 100 sets the drive-assist system(s) and/or autonomous motive function(s) to the corresponding default activated mode(s). Otherwise, in response to the processor 420 of the dongle 200 determining that the communication module 424 has received the instructions from a remote control unit, the method 500 proceeds to block 508.

At block 508, the processer 410 of the dongle 200 determines a dongle location of the dongle 200 and/or a vehicle location of the vehicle 100. For example, the processer 410 of the dongle 200 receives the dongle location via the GPS receiver 426 of the dongle 200 and/or receives the vehicle location via the GPS receiver 112 of the vehicle 100. At block 510, the processer 410 of the dongle 200 determines a current time, for example, via the clock 428 of the dongle 200.

At block 512, the processor 410 of the dongle 200 determines whether the dongle and/or vehicle location and the current time correspond to a racing event. For example, the processor 410 of the dongle 200 determines whether the dongle and/or vehicle location matches the racing event location of a racing event. In some examples, the processor 410 of the dongle 200 determines whether the dongle and/or vehicle location matches the racing event location by determining whether the dongle and/or vehicle location is within the geofence 302 that corresponds to the racing event location of the racing event. Further, the processor 410 of the dongle 200 determines whether the current time matches the racing event time of a racing event. In response to the processor 410 of the dongle 200 determining that the dongle and/or vehicle location or the current time do not correspond to the racing event, the method 500 proceeds to block 504 at which the drive-assist controller 114 of the vehicle 100 sets the drive-assist system(s) and/or autonomous motive function(s) to the corresponding default activated mode(s). Otherwise, in response to the processor 410 of the dongle 200 determining that the dongle and/or vehicle location and the current time do correspond to the racing event, the method 500 proceeds to block 514.

At block 514, the processor 410 of the dongle 200 sends the instructions to the vehicle for deactivating drive-assist system(s) and/or autonomous motive function(s) of the ECUs 406 while the vehicle 100 participates in the racing event. At block 516, the drive-assist controller 114 receives the instructions from the processor 410 of the dongle 200. At block 518, the drive-assist controller 114 identifies which of the drive-assist system(s) and/or autonomous motive function(s) are to be deactivated and sets those drive-assist system(s) and/or autonomous motive function(s) to a deactivated mode.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities, often in conjunction with sensors. A "module" and an "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   an electronic control unit for performing an autonomous motive function;
   an on-board diagnostic (OBD) port configured to receive a dongle to communicatively couple to the dongle; and
   a drive-assist controller configured to, responsive to the OBD port receiving the dongle:
   wirelessly communicate, via the dongle, with at least one external database storing information of an event defined at a predetermined location at a predetermined time;
   determine, via the dongle, whether the vehicle is positioned in the predetermined location at the predetermined time;
   responsive to determining that the vehicle is positioned in the predetermined location at the predetermined time, receive instructions from the dongle; and
   deactivate the autonomous motive function when receiving the instructions.

2. The vehicle of claim 1, wherein the electronic control unit is an autonomy unit, a speed control unit, or a brake control module.

3. The vehicle of claim 1, wherein the drive-assist controller activates the autonomous motive function when not receiving the instructions from the dongle.

4. The vehicle of claim 1, wherein the drive-assist controller identifies the autonomous motive function to deactivate based upon the instructions and a vehicle type.

5. The vehicle of claim 1, wherein, upon deactivating the autonomous motive function, the drive-assist controller is to reactivate the autonomous motive function responsive to at least one of the OBD port being decoupled from the dongle and the vehicle not being at the predetermined location at the predetermined time.

6. A dongle comprising:
   a connector configured to couple to a port of a vehicle;
   a global positioning system (GPS) receiver configured to determine a dongle location;
   a communication module configured to receive, from a remote control unit storing information of an event defined at a predetermined location at a predetermined time, instructions for deactivating an autonomous motive function of the vehicle; and
   a processor configured to send the instructions to the vehicle responsive to: (1) the connector being coupled to the port; (2) determining that the dongle location corresponds to the predetermined location; and (3) determining that the vehicle is positioned at the predetermined location at the predetermined time.

7. The dongle of claim 6, wherein the connector is configured to couple to at least one of an on-board diagnostic (OBD) port and a USB port of the vehicle.

8. The dongle of claim 6, wherein the processor does not send the instructions to cause the vehicle to activate the autonomous motive function of the vehicle responsive to at least one of the connector being decoupled from the port and the dongle location not corresponding to the predetermined location.

9. The dongle of claim 6, wherein the processor obtains vehicle characteristics of the vehicle when the connector is coupled to the port of the vehicle.

10. The dongle of claim 9, wherein the instructions correspond to the vehicle characteristics and racing event characteristics of a racing event at the predetermined location.

11. The dongle of claim 6, further including a clock to determine a current time.

12. The dongle of claim 6, wherein:
    the communication module receives the instructions from the remote control unit during the predetermined time; and
    the processor sends the instructions to the vehicle when the dongle location is within a geofence corresponding to the predetermined location.

13. A method comprising:
    determining a dongle location of a dongle via a global positioning system (GPS) receiver;
    receiving, via a communication module of the dongle, instructions from a remote control unit storing information of an event defined at a predetermined location at a predetermined time to deactivate an autonomous motive function of a vehicle; and
    sending, via a processor of the dongle, the instructions to the vehicle responsive to: (1) the dongle being coupled to a port of the vehicle; (2) the dongle location corresponding to the predetermined location; and (3) the vehicle being positioned at the predetermined location at the predetermined time.

14. The method of claim 13, further including determining a current time via a clock of the dongle.

15. The method of claim 13, further including:
receiving, via the communication module of the dongle, the instructions from the remote control unit prior to the event, the instructions identify the predetermined location at the predetermined time; and
sending, via the processor of the dongle, the instructions to the vehicle when a current time corresponds to the predetermined time.

16. The method of claim 13, further including:
receiving the instructions via the communication module of the dongle during the predetermined time; and
sending, via the processor of the dongle, the instructions to the vehicle when the dongle location is within a geofence of the predetermined location.

17. The method of claim 13, further including deactivating, via a drive-assist controller of the vehicle, the autonomous motive function of an electronic control unit when receiving the instructions from the dongle.

18. The method of claim 17, further including activating, via the drive-assist controller, the autonomous motive function of the electronic control unit when not receiving the instructions from the dongle.

* * * * *